United States Patent [19]

Al-Muddarris

[11] 4,309,402

[45] Jan. 5, 1982

[54] PROCESS AND APPARATUS FOR PRODUCTION OF ELEMENTAL SULFUR

[75] Inventor: Ghazi R. Al-Muddarris, Cologne, Fed. Rep. of Germany

[73] Assignee: Davy International AG, Frankfurt, Fed. Rep. of Germany

[21] Appl. No.: 168,355

[22] Filed: Jul. 11, 1980

Related U.S. Application Data

[63] Continuation of Ser. No. 968,399, Dec. 11, 1978, abandoned.

[30] Foreign Application Priority Data

Dec. 10, 1977 [DE] Fed. Rep. of Germany ....... 2755138

[51] Int. Cl.³ .............................................. C01B 17/04
[52] U.S. Cl. .............................................. 423/574 R
[58] Field of Search ........................ 423/573, 574, 576

[56] References Cited

U.S. PATENT DOCUMENTS

| 2,760,848 | 8/1956 | Dunning | 423/574 |
| 2,767,062 | 10/1956 | Duecker | 423/576 |
| 3,702,884 | 11/1972 | Hunt et al. | 423/574 |
| 4,035,474 | 7/1977 | Kunkel et al. | 423/576 |

FOREIGN PATENT DOCUMENTS 717483 10/1954 United Kingdom ............... 423/576

*Primary Examiner*—G. O. Peters
*Attorney, Agent, or Firm*—Bernard, Rothwell & Brown

[57] ABSTRACT

A process is provided involving the production of elemental sulfur via the Claus reaction of hydrogen sulfide and sulfur dioxide. A gas feedstream containing $H_2S$ and $SO_2$ is passed through solid catalyst beds below the sulfur dew point to thereby deposit the sulfur formed on the catalyst bed. Sulfur is then removed from the catalyst bed by passing heated effluent gas from another catalyst bed through the first bed to vaporize the deposited sulfur and thereby regenerate the first catalyst bed. Reactor apparatus especially suitable for practicing this process is also provided.

16 Claims, 1 Drawing Figure

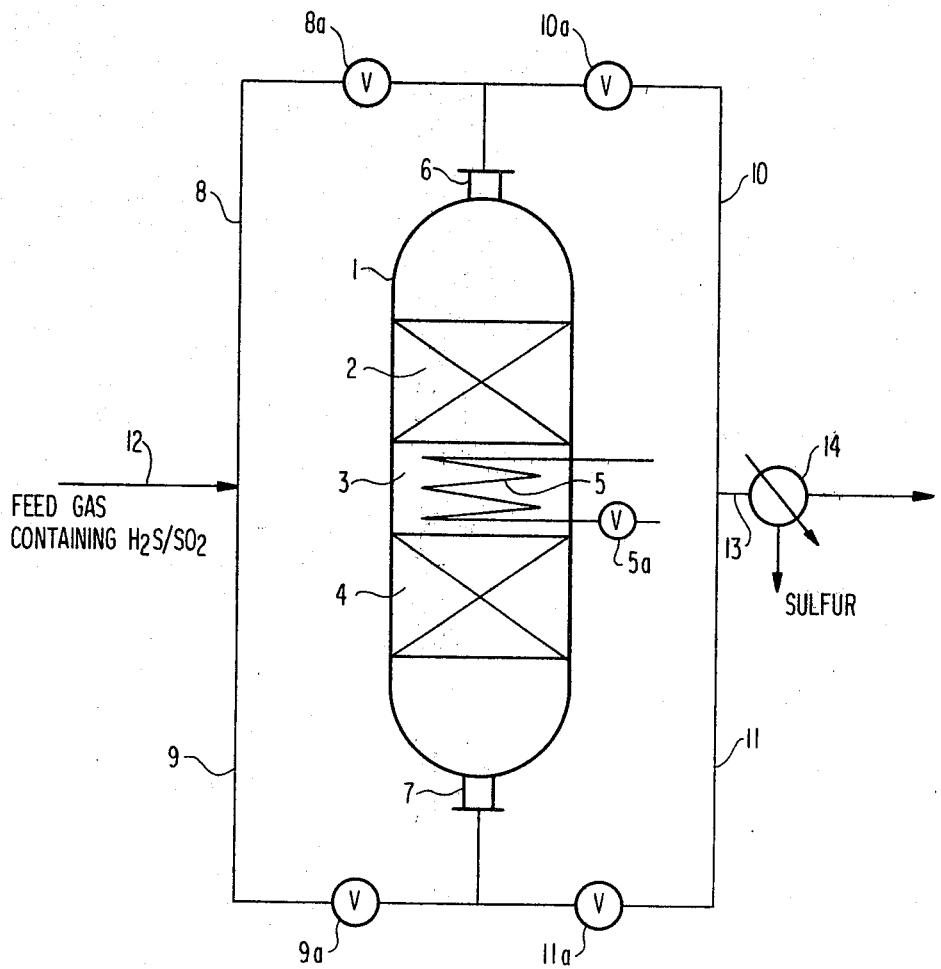

PROCESS AND APPARATUS FOR PRODUCTION OF ELEMENTAL SULFUR

This is a continuation of application Ser. No. 968,399 filed Dec. 11, 1978 now abandoned.

This invention relates to a process for reacting a gas containing sulfur dioxide and hydrogen sulfide to form elemental sulfur. In order to produce elemental sulfur from hydrogen sulfide, approximately one-third of the moles of the hydrogen sulfide is oxidized to sulfur dioxide, and this sulfur dioxide is reacted with the residual hydrogen sulfide by the Claus process, corresponding to the reaction $$2H_2S + SO_2 \rightarrow 3/x\, S_x + 2H_2O$$

The Claus reaction can be carried out thermally at temperatures from, for example, 950° to 1350° C., or catalytically, for example, at temperatures between 130° and 340° C. In order to obtain a high yield of sulfur and a tail gas of acceptable purity, the gas is reacted in succession in a thermal stage and a catalytic stage. In the thermal stage, up to one-third of the hydrogen sulfide is burnt to form sulfur dioxide. Sulfur is partially formed from the formed sulfur dioxide and the hydrogen sulfide, and this sulfur is condensed out by cooling the gas to a temperature below the sulfur dew point, for example, to about 120° to 140° C. In this way, up to about 70 percent of the sulfur contained in the feed gas as hydrogen sulfide is separated out.

After having separated out the sulfur, the remaining gases are further reacted, using a Claus catalyst, above the sulfur dew point. For this purpose, the gases are heated before the contacting operation. Normally, the gas flows through at least two such Claus catalyst stages, between which the reaction gas is cooled to below the sulfur dew point, the condensed sulfur is removed and the residual gas is heated again before entering the next Claus catalyst bed. Suitable Claus catalysts are, for example, activated aluminum oxides or bauxite.

The activity of Claus catalysts decreases with relatively long operating times. This decrease in activity is shown in a smaller conversion of hydrogen sulfide and sulfur dioxide to sulfur and in an increase in the concentration of the said sulfur compounds in the waste gas of the catalyst stage.

It is known to conduct the tail gas of a Claus plant through adsorption reactors, which reactors are regenerated by passing therethrough a hot gas after they have been completely charged with sulfur. For this purpose, aside from the Claus installation, it is necessary to have additional adsorption reactors charged with active carbon or aluminum oxide and a separate regeneration system for these reactors.

It is also known to operate the last catalyst stage with a gas inlet temperature of about 130° C. (cold bed adsorption process), so that a thermodynamic/equilibrium favorable for the formation of sulfur and thus a lower content of sulfur compounds in the effluent gas is adjusted in this stage. For this purpose, at least three reactors are necessary, namely, one for each for the normal Claus reaction at a gas inlet temperature of about 230° C., the said low-temperature Claus reaction at 130° C. and the regeneration at about 370° C. These reactors are connected in series, so that each reactor in succession takes over these three functions. Since always one of the reactors is in the regeneration phase, it is necessary to have an additional reactor. Due to the high regeneration temperature, the reactor which is disposed in the regeneration phase contributes not at all or only to a small extent to the formation of sulfur. Furthermore, the cyclic changing over of the reactors involves a considerable expense for valves and pipe conduits.

Finally, it is also known for the catalytic Claus reactors operated in the temperature range from 215° C. to 330° C., after the decrease of the total conversion, to be regenerated in series by passing therethrough a gas at a temperature of at least 340° C. With this process, more especially during the regeneration phases, no high degree of sulfur formation is achieved, so that the tail gas still shows a comparatively high content of sulfur compounds.

The present invention has for its object to avoid a separate regeneration system for the circulation of the regeneration gas and more especially to carry out the regeneration under moderate conditions, so that the catalyst does not suffer any damage.

According to the invention, this object is achieved by the effluent gas from a first bed in the charging phase being heated during a first part of this phase to above the sulfur dew point and being conducted through a second bed for the purpose of regenerating the second bed, and conducting the said gas during the second part of this phase, without heating, through the second bed for the purpose of cooling the second bed. The effluent gas from the first bed not only has a low sulfur dew point, but also its content of $H_2S$ is very low because of the low-temperature reaction which assists the formation of sulfur, so that it is excellently suitable for the absorption of the sulfur changing into the gas phase with the regeneration of the second bed. Since this gas is available in considerable quantity during the entire charging phase of the first bed, comparatively little heating of the gas is sufficient in order to desorb the sulfur adsorbed in the second bed and to discharge it with the gas. After the heating of the second bed and sulfur desorption, the heating of the effluent gas from the first bed is interrupted. The gas then flows at the temperature of the first bed into the second bed and cools the latter bed to the reaction temperature. Since the quantity of regeneration gas and thus the regeneration time corresponds, in order of value, to the reaction gas quantity and the separation time, respectively, a comparatively small increase of the temperature of the gas flowing to the second bed is sufficient in order to completely discharge the sulfur from the second bed.

In accordance with the preferred embodiment of the process according to the invention, the direction of flow of the gas through the two beds is reversed after one of the two beds has become charged with sulfur. The gas to be reacted then flows, first of all, through the regenerated, cooled bed, in which takes place the catalytic reaction or conversion to sulfur and the deposition of the sulfur in the bed. The effluent gas from the latter bed which is freed as far as possible from sulfur, $H_2S$ and $SO_2$, thereafter serves, after heating to above the sulfur dew point, for the regeneration of the bed previously charged with sulfur. In this way, the flow of the gas converted during the passage through the catalyst beds from a reaction gas containing $H_2S$ and $SO_2$ into a sulfur-containing regeneration gas is periodically reversed, so that each bed passes in succession through the charging, regeneration and cooling phases.

According to the preferred embodiment, the sulfur is condensed out of the regeneration gas discharging from the second bed.

After the sulfur condensation, the tail gas may be subsequently burnt and blown into the atmosphere. Since both beds alternately supply regeneration gas which contains sulfur, a substantially continuous condensation is produced, which is only interrupted by the cooling periods.

The effluent gas from the first bed during the first part of the charging phase can be heated by indirect heat exchange with process gas from a preceding Claus stage, or with steam, or by electrical heating or other suitable heating means.

Since the temperature of the effluent gas from the first bed only has to be raised by a small amount, the heating in a heat exchanger is sufficient, and it becomes possible to avoid the heating in a gas-fired furnace, which is the usual procedure with known processes. Steam is available from the preceding Claus process. During the cooling phases, it is sufficient to interrupt the flow of the heating means through the heat exchanger or the electrical heating. The temperature of the gas flowing into the second bed then returns very quickly to the temperature of the first bed, so that the bed is recooled in the manner which is desired.

Preferably the reaction in the first catalyst bed is conducted at a temperature which is in the range from above the sulfur melting point to 160° C. At this temperature, generally the dew point of the sulfur is not reached, so that the elemental sulfur which is formed during the Claus reaction is deposited in the catalyst bed.

Provision is further made for the gas discharging from the first bed and for the regeneration of the second bed to be heated to a temperature in the range from at least 10° C. above the reaction temperature of the first bed up to 400° C., and advantageously to a temperature from 160° to 260° C. With this heating procedure, the sulfur capacity of the gas is sufficient for the regeneration and discharge of the desorbed sulfur. Since only a relatively low temperature of the regeneration gas is necessary, it is also possible for this purpose to use flow media at low temperature from the process, as for example the exhaust or waste gas from a Claus catalyst unit, for the heat transfer by heat exchange.

The regeneration and cooling periods are advantageously chosen to be substantially the same as the charging period. Since the regeneration temperature is relatively low, a relatively short time is sufficient for recooling the bed to the reaction temperature, so that the cooling period is generally short by comparison with the regeneration period.

According to the preferred embodiment of the invention, in order to achieve an average conversion in the range from 97 to 99.5 percent, provision is made for the catalyst beds operated in accordance with the invention to be arranged as the last stage or in several of the last stages of a multi-stage Claus plant, advantageously a two-stage, three-stage or four-stage plant.

In the other catalyst stage or stages of the Claus plant, i.e., the stages not operated with a "cold" bed, the reaction is preferably carried out with a gas inlet temperature in the range from 180° to 250° C. In order to achieve a high sulfur output, the temperature of the first catalyst stage is sufficiently high for the necessary hydrolysis of carbon oxysulfide and carbon disulfide contained in the process gas. In addition, the apparatus for the condensation and separation or deposition of the elemental sulfur is so designed that a minimal loss of sulfur with the waste gas is produced. In addition, the $H_2S/SO_2$ molar ratio is adjusted as accurately as possible to the stoichiometric value.

The gas to be reacted is preferably allowed to flow through the catalyst beds with a volume hourly space velocity of 200 to 1500 $h^{-1}$, advantageously from 400 to 1200 $h^{-1}$, related to a gas volume at 15° C. and 760 mm Hg. It is possible to work with a gas velocity in the catalyst bed from 0.1 to 1.2 meters/second (m/s), advantageously 0.2 to 0.8 m/s. The height of the bed is advantageously 0.8 to 1.3 m. The height of the bed and the catalyst volume, respectively, may however also be substantially larger; the charging and regeneration and cooling times, respectively, are also correspondingly lengthened.

Provision is made for the $H_2S/SO_2$ molar ratio in the reaction gas entering the first catalyst bed to be adjusted to the stoichiometric value of about 2.0.

With one particular embodiment, the $H_2S/SO_2$ molar ratio in the reaction gas entering the first catalyst bed is adjusted to a value of greater than about 2.0, the sulfur is separated out from the effluent gas from the second catalyst bed, the residual $H_2S$-containing gas has added thereto a quantity of air sufficient for the $H_2S$ oxidation to elemental sulfur and the gas is then allowed to flow through an additional pair of catalyst beds. What is achieved by the superstoichiometric $H_2S/SO_2$ molar ratio at the entry of the first pair of catalyst beds is that all the sulfur dioxide is converted by the Claus reaction in the bed to sulfur, and an $H_2S$-containing gas which contains practically no more $SO_2$ discharges from the bed. The quantity of air or oxygen necessary for oxidizing the $H_2S$ to elemental sulfur is then added to the said gas, after it has been used for the regeneration and condensation of the desorbed sulfur. In the first bed of the second pair of catalyst beds, the hydrogen sulfide is oxidized to a highest possible degree to elemental sulfur, and the sulfur is deposited. The second pair of catalyst beds is also regenerated in the manner according to the invention and the sulfur driven off is deposited in the condenser. Using this constructional form having two cold beds connected in series, a sulfur yield higher than 99.5 percent is obtained. Conventional Claus catalysts can be used with the process according to the invention, for example, catalysts which are based on activated aluminum oxide or bauxite. The size of the catalyst particles is preferably in the range from 2 to 6 mm.

The gases flowing to the catalytic section of the Claus installation may have an $H_2S$ content from 0.01 to 5 percent by volume, advantageously 0.1 to 1.0 percent by volume. In particular cases, however, gases with a substantially higher hydrogen sulfide content can be further processed to provide sulfur, using the process according to the invention.

The stoichiometric $H_2S/SC_2$ ratio necessary for the catalytic reaction is obtained by the oxidation in the thermal Claus stage or, in the absence of the thermal stage, by addition of a quantity of air which is sufficient for adjusting the stoichiometric ratio. The gas to be reacted may contain, as well as $H_2S$ and $SO_2$, also nitrogen, hydrogen, carbon dioxide, carbon monoxide, steam, hydrocarbons as well as carbon oxysulfide and carbon disulfide.

Depending on the sulfur content of the gas, the sulfur dew point is generally in the range from about 125° to 210° C. In the reaction phases which are accompanied by the deposition of sulfur in the catalyst bed, it is important not to fall below the solidification temperature of the sulfur, of about 122° C., so as to avoid any obstruction of the catalyst bed.

A reactor for carrying the process according to the invention into effect consists of a vessel having a catalyst arranged therein and a connecting pipe on each of the upstream and downstream sides of the catalyst, respectively, for the supply and discharge of the gas, and is characterized according to the invention in that two catalyst beds separated by an interstice are arranged in the vessel and a heating means is provided for heating the gas during its passage from one catalyst bed to the other. The result of arranging both catalyst beds in an elongated vessel is that there is a substantial saving in costs as compared with the known reactors, with which each catalyst bed is arranged in a separate vessel.

The heating means may be a heat exchanger arranged outside the interstice. Advantageously, and particularly with relatively small capacities, the heating means is a heat exchanger arranged in the interstice. The gas which flows out of the first catalyst bed and which has a low content of elemental sulfur and sulfur compounds flows around the tubes of the heat exchanger, while the heating means, as, for example, process gas or steam, flows through the tubes of the heat exchanger.

It is further preferred that each of the two connecting pipes is connected through pipes to control valves arranged in the latter, on the outside to the supply pipe for the gas to be reacted and on the other side to a pipe leading to a sulfur condenser. With such an arrangement, the control valves and a control member for the heating means can be actuated by a time switch device, according to the reaction, regeneration and cooling periods and the reversal of the direction of the gas flow.

One embodiment of the reaction plant according to the invention is hereinafter more fully explained by reference to the drawing, in which the reactor with the associated pipe conduits, valves and the sulfur condenser is shown in diagrammatic form.

According to the drawing, an upper solid catalyst bed 2 and a lower solid catalyst bed 4 are arranged in a vertical, cylindrical vessel 1. Arranged in the interstice 3 between the catalyst beds is the heat exchanger 5 for heating up the gas which flows from bed 2 to bed 4 or in the opposite direction. Connecting pipes 6 and 7 are arranged at the top and bottom of the container, respectively. The pipe 6 is connected by way of a pipe 8 with the control valve 8a arranged in the pipe to the gas supply pipe 12. The pipe 7 is also connected through a pipe 9 with the control valve 9a disposed therein to the gas supply pipe 12. The pipe 6 is also connected through the pipe 10 with the control valve 10a to the gas discharge pipe 13, which leads to the sulfur condenser 14. Likewise, the pipe 7 is connected through a pipe 11 with the control valve 11a and the pipe 13 to the sulfur condenser 14.

In operation, first of all the valves 8a and 11a are opened and the valves 9a and 10a are closed. The gas to be reacted and entering through the pipe 12 passes by way of the pipe 8 and pipe 6 into the container 1 and first of all flows through the first catalyst bed 2, in which is effected the conversion of $H_2S$ and $SO_2$ to sulfur and the deposition of the sulfur on the catalyst, for example, at 135° C. While the bed 2 is being charged with sulfur, the gas largely freed from sulfur compounds and elemental sulfur and discharging from this bed is heated in the interstice 3 by the heat exchanger 5, with the control member 5a set for heating purposes, for example, to about 185° C. This heated gas then flows through the catalyst bed 4 which was charged in the preceding phase with sulfur, heats up the bed and volatilizes the sulfur deposited therein. The gas containing sulfur vapor passes from the bed 4 by way of the pipe 7 into the pipe 11, with the opened valve 11a and the pipe 13 to the sulfur condenser 14, in which the gas is cooled to 125° to 135° C. and the sulfur is condensed out. After complete desorption and removal of the sulfur from the bed 4, the supply of the heating medium to the heat exchanger 5 is interrupted by switching over the control member 5a. The effluent gas from the catalyst bed 2 at about 135° C. then passes after a short time and at this temperature into the catalyst bed 4 and cools the latter.

After complete charging of the catalyst bed 2, the valves 9a and 10a are opened, the valves 8a and 11a are closed and the supply of the heating medium to the heat exchanger 5 is again switched on by once again actuating the control member 5a. The gas to be reacted now flows through the pipes 12, 9 and the pipe 7 in an upward direction through the beds 4, 2. In this case, the Claus reaction occurs in the bed 4, and the bed is charged with sulfur. The effluent gas from the bed 4 is once again heated by the heat exchanger 5, and then in its turn heats the charged catalyst bed 2 and causes the volatilization of sulfur from this bed. The waste or exhaust gas charged with sulfur flows through the pipe 6 and the pipes 10, 13 to the condenser 14, in which the sulfur is condensed. After complete volatilization of the sulfur from the bed 2, the heating of the heat exchanger 5 is once again interrupted, so that the bed 2 is again recooled by the relatively cold gas discharging from the bed 4. After complete charging of the catalyst bed 4, the valves 8a–11a are once again changed over, so that the gas to be reacted is once again able to flow downwardly through the catalyst beds 2, 4.

What is claimed is:

1. In the process for reacting a gas containing hydrogen sulfide and sulfur dioxide to form elemental sulfur via the Claus reaction, wherein said gas is passed through a plurality of solid catalyst beds at an elevated temperature which is below the sulfur dew point, to thereby charge said catalyst beds with at least a part of the sulfur formed and wherein said catalyst beds are subsequently regenerated by passing heated gas therethrough, the improvement which comprises:

(A) passing the hydrogen sulfide and sulfur dioxide containing gas during a charging phase through a first catalyst bed at a temperature below the sulfur dew point so as to charge the bed with sulfur;

(B) heating all effluent from the first catalyst bed during a first part of the first catalyst bed charging phase to a temperature above the sulfur dew point;

(C) passing said heated effluent to a sulfur-containing second catalyst bed in order to vaporize sulfur from said second catalyst bed and to thereby regenerate said second catalyst bed;

(D) discontinuing the heating of said first catalyst bed effluent during a second part of the first catalyst bed charging phase such that the temperature of said effluent falls below the sulfur dew point;

(E) passing said cooler effluent through said regenerated second catalyst bed to thereby cool said regenerated second catalyst bed;

(F) passing the effluent from the second catalyst bed through a sulfur condenser so as to condense vaporized sulfur contained in the effluent;

(G) withdrawing sulfur condenser waste gas directly from the process; and (H) reversing the direction of flow of the gas through said first and second catalyst beds after the first catalyst bed has been charged with sulfur.

2. A process according to claim 1 wherein step H includes the steps of passing the hydrogen sulfide and sulfur dioxide containing gas during a charging phase through the second catalyst bed at a temperature below the sulfur dew point so as to charge the bed with sulfur;

heating effluent from the second catalyst bed during a first part of the first catalyst bed charging phase to a temperature above the sulfur dew point;

passing said heated effluent to the sulfur-containing first catalyst bed in order to vaporize sulfur from said first catalyst bed;

discontinuing the heating of said second catalyst bed effluent during a second part of the catalyst bed charging phase such that the temperature of said effluent falls below the sulfur dew point; and passing said cooler effluent through said regenerated first catalyst bed to thereby cool said regenerated first catalyst bed.

3. A process according to claim 2 wherein the vaporized sulfur is condensed from the regeneration gas effluent.

4. A process according to claim 3 wherein the first catalyst bed effluent gas during the first part of the charging phase is heated by indirect heat exchange with process gas from a preceding Claus stage or with steam or by electric heating means.

5. A process according to claim 2 wherein the charging phase in either of the catalyst beds is carried out at a temperature in the range from above the melting point of the sulfur to about 160° C.

6. A process according to claim 5 wherein the effluent gas from either of the catalyst beds is heated to a temperature in the range from at least 10° C. above the charging phase temperature of the bed up to about 400° C. for the regeneration of the other catalyst bed.

7. A process according to claim 5 wherein the effluent gas from either of the catalyst beds is heated to a temperature of from about 160° C. to 260° C. for the regeneration of the other catalyst bed.

8. A process according to claim 4 wherein the time period for regeneration and cooling is chosen to be substantially equal in time to the charging phase.

9. A process according to claim 4 wherein, for the purpose of achieving an average sulfur conversion in the range from 97 to 99.5 percent, the first and second catalyst beds are arranged as one or more of the last stages of a two-stage, three-stage or four-stage Claus plant.

10. A process according to claim 9 wherein the reaction in the initial stages of the multi-stage Claus plant is carried out at a gas inlet temperature in the range from about 180° to 250° C.

11. A process according to claim 1, 2, 3, 4, 5, 6, 7, 8, 9 or 10 wherein the gas to be reacted is allowed to flow through the catalyst beds with a volume hourly space velocity of about 200 to 1500 $h^{-1}$ based on a gas volume at 15° C. and 760 mm Hg.

12. A process according to claim 1, 2, 3, 4, 5, 6, 7, 8, 9 or 10 wherein the process is operated at a gas velocity in the catalyst beds of from about 0.1 to 1.2 m/s.

13. A process according to claim 12 wherein the process is operated at a gas velocity in the catalyst beds of from about 0.1 to 1.2 m/s.

14. A process according to claim 1, 2, 3, 4, 5, 6, 7, 8, 9 or 10 wherein the molar ratio of $H_2S/SO_2$ in the reaction gas entering the catalyst beds is adjusted to the value which is stoichiometrically necessary.

15. A process according to claim 13 wherein the molar ratio of the $H_2S/SO_2$ in the reaction gas entering the catalyst beds is adjusted to the value which is stoichiometrically necessary.

16. A process according to claim 14 wherein the $H_2S/SO_2$ mole ratio in the gas to be reacted in the charging phase of the catalyst beds is adjusted to a value greater than 2, the $H_2S$-containing gas discharging from the catalyst bed undergoing regeneration or cooling has added thereto a quantity of air sufficient to oxidize the $H_2S$ to elemental sulfur and the gas mixture is then allowed to flow through an additional pair of catalyst beds where hydrogen sulfide is oxidized to elemental sulfur and the sulfur is deposited on the catalyst beds.

* * * * *